United States Patent

[11] 3,594,022

| [72] | Inventor | Leslie A. Woodson<br>Long Beach, Calif. |
|---|---|---|
| [21] | Appl. No. | 802,144 |
| [22] | Filed | Feb. 25, 1969 |
| [45] | Patented | July 20, 1971 |
| [73] | Assignee | W. S. Shamban & Co.<br>Los Angeles, Calif. |

[54] SEAL
11 Claims, 4 Drawing Figs.

[52] U.S. Cl. .................................................. 285/336,
277/188, 285/354
[51] Int. Cl. .................................................. F16l 17/00
[50] Field of Search .......................................... 285/336,
354; 277/188, 193, 198

[56] References Cited
UNITED STATES PATENTS
1,873,855  8/1932  Wilson .......................... 285/336

| 2,342,422 | 2/1944 | Morehead et al | 285/336 |
| 2,717,793 | 9/1955 | Nenzell | 285/336 X |
| 3,189,371 | 6/1965 | Swan | 285/336 X |
| 3,279,805 | 10/1966 | Ouinson | 277/188 X |

FOREIGN PATENTS
| 628,480 | 10/1961 | Canada | 277/188 |
| 6,891 | 1886 | Great Britain | 285/DIG. 11 |

Primary Examiner—Dave W. Arola
Attorney—Smyth, Roston and Pavitt

ABSTRACT: This disclosures describes a seal which includes a sealing ring constructed of deformable plastic material and inner and outer retainer rings engaging the inner and outer peripheral surfaces, respectively, of the sealing ring. The retainer rings are preferably mounted on the sealing ring and each of the retainer rings is substantially noncompressible in the axial direction.

PATENTED JUL 20 1971
3,594,022
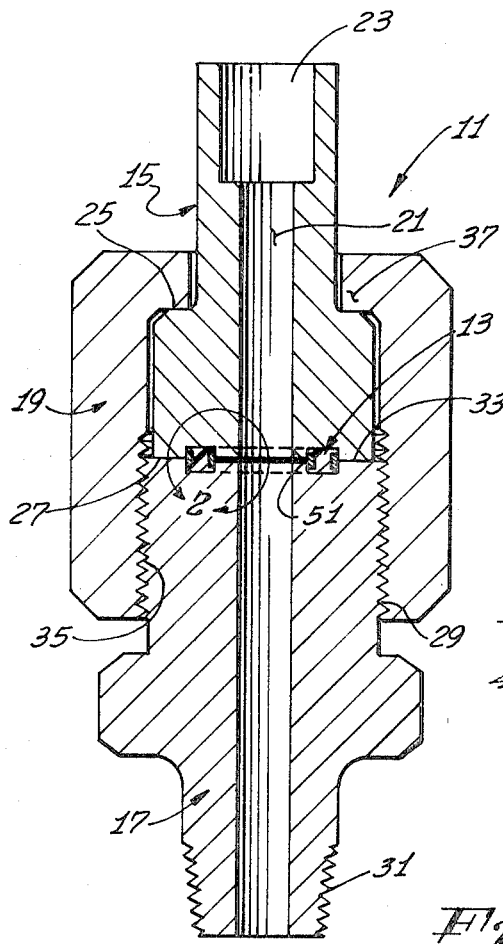
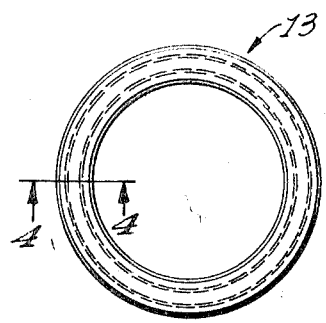
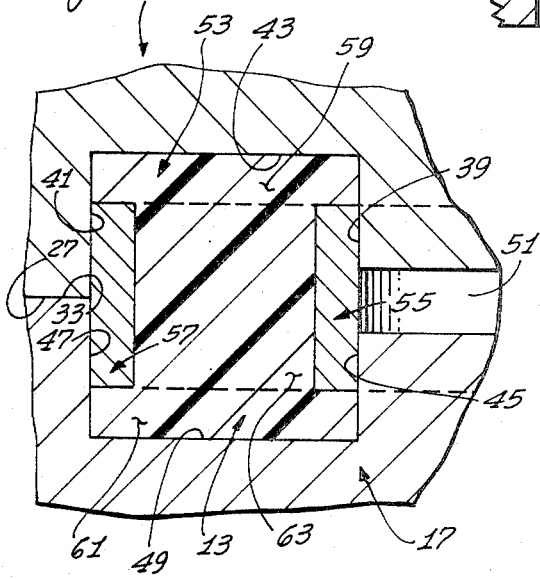
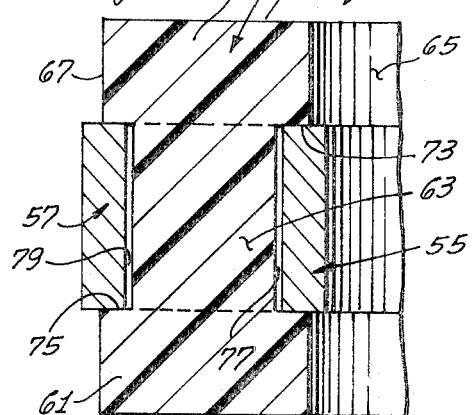
INVENTOR:
Leslie A. Woodson
By Smyth, Roston & Pavitt
ATTORNEYS

SEAL

BACKGROUND OF THE INVENTION

The low temperatures and wide temperature variations inherent in conduits carrying cryogenic liquids present substantial problems in the sealing of such conduits and the connectors therefor. Recently, it has been proposed to utilize a seal which is constructed of a plastic material and which can be deformed into the general shape of the sealing channel in which it is positioned. The plastic material will also conform to the minute surface irregularities of the wall of the sealing channel in which it is positioned to thereby effect a tight seal. The plastic utilized is sufficiently ductile to provide a tight seal even at low temperatures.

The mass of plastic is surrounded by two spring strips, one of which is generally semicircular in axial cross section and the other of which has a u-shaped portion in axial cross section which projects deeply into the plastic material. When the plastic is compressed in a first direction, the spring strips are also compressed in the same direction with the two legs of the U-portion being squeezed together.

These spring strips, because of their intricate shape, complicate seal construction and add to the expense of manufacturing. Of at least equal importance is the fact that a spring strip type seal cannot be made sufficiently small to fit in a small seal channel. The primary reason for this is that the intricate, wavelike, spring-shape would have to be virtually paper thin to fit in a small seal channel. For example, the U-portion would have to be extremely thin. This excessive thinness of the intricate spring strips would render them too weak structurally to perform any useful function.

SUMMARY OF THE INVENTION

The present invention provides an excellent seal at low and varied temperatures while eliminating the spring strips used heretofore with seals of this type. Thus, the seal of the present invention is of simple construction and less expensive than prior art seals of this general character. In addition, the seal of this invention can be used in grooves ranging from very small to very large.

According to the present invention, the spring strips are eliminated and two retainer rings are provided adjacent a sealing ring. The two retainer rings are preferably concentric with the sealing ring and positioned, respectively, along the inner and outer peripheral surfaces of the sealing ring.

The sealing ring is constructed of deformable plastic material. When the sealing ring is placed in axial compression, it expands radially to form a tight seal with the surfaces which it contacts.

Each of the retainer rings has means for at least substantially preventing axial compression thereof in response to an axial compressive force exerted on the sealing ring. The retainer rings preferably have a simple configuration in axial cross section. Although the inner surface of the retainer rings may project into the plastic sealing ring, any such projection should not be of the type which requires spaced compressible leg portions such as the U-portion of the prior art seal. As the retainer rings are of an elementary configuration in axial cross section, they may be made very small without excessive thinning and weakening of the retainer rings.

The retainer rings of this invention serve several important functions. First, the retainer rings are positioned so as to cover any gap into which the plastic sealing ring might tend to extrude when subjected to a compressive force. Secondly, with the retainer rings being concentrically arranged with the sealing ring lying therebetween, the inner retainer ring is placed in compression and the outer retainer ring is placed in tension in response to an axial compressive force applied to the sealing ring. The two retainer rings resist the forces applied thereto, and therefore resist radial expansion of the sealing ring in the region of the sealing ring lying intermediate the two retainer rings. This assures that substantial axial compressive force must be applied to the sealing ring to cause it to assume the desired shape. As substantial compressive force is applied, the sealing ring will closely conform to the minute surface irregularities of the seal channel.

Third, the retainer rings help to reshape the plastic seal ring after the axial compressive force is removed. Thus, as the inner retainer ring is placed in compression and the outer retainer ring is placed in tension by the seal ring, the region of the sealing ring intermediate the retainer rings is tightly squeezed by the retainer rings. Thus, when the axial compressive force is removed from the sealing ring, the two retainer rings squeeze such region of the sealing ring therebetween and therefore tend to axially elongate the sealing ring or deform it back toward its initial position.

The retainer rings can most effectively carry out their functions if they are mounted on the sealing ring. This is preferably accomplished by forming inner and outer annular grooves on the inner and outer peripheral surfaces, respectively, of the sealing ring and positioning the retainer rings in these grooves. Preferably, a radial clearance space is provided between each of the retainer rings and the sealing ring to provide limited space for free radial expansion of the sealing ring.

Each of the retainer rings may be of various configurations in axial cross section so long as there is no overlapping or folding over of the material of the retainer rings. Thus, projecting U-shaped, springlike, portions should be avoided. Preferably, both the inner and outer peripheral faces of the retainer rings are generally cylindrical with the axial cross-sectional configuration being rectangular and with the long dimension of the rectangle extending generally axially.

The seal of this invention may be used in many environments, however, it is particularly adapted for use in a connector for cryogenic conduits. One such connector includes two members movable toward each other and defining therebetween a seal channel into which the seal can be positioned. The two members of the connector are movable toward each other to deform the plastic sealing ring into tight sealing engagement with the surfaces of the sealing channel while the retainer rings perform the functions set forth above.

This invention, both as to its organization and method of operation together with further features and advantages thereof may best be understood by reference to the following description taken in connection with the accompanying illustrative drawings.

BRIEF DESCRIPTION OF THE DRAWING

FIG. 1 is an axial sectional view of a connector having a seal constructed in accordance with the teachings of this invention mounted therein.

FIG. 2 is an enlargement of the portion of FIG. 1 generally embraced by the line designated by the numeral 2 and illustrating the seal and the surrounding connector structure in axial cross section. The seal is shown in the axially compressed condition and the cross section shown is typical.

FIG. 3 is a front elevational view of the seal.

FIG. 4 is a typical enlarged sectional view taken along line 4—4 of FIG. 3 with the seal being in the relaxed uncompressed condition.

DESCRIPTION OF THE PREFERRED EMBODIMENT

FIG. 1 of the drawing shows a connector 11 having a seal 13 constructed in accordance with the teachings of this invention mounted therein. The connector 11 includes two connector members 15 and 17 interconnected by a nut 19. The connector 11 has an axial, cylindrical passage 21 extending completely through the connector members 15 and 17.

In the embodiment illustrated, the connector member 15 has an axial counterbore 23 therein which forms an enlarged end portion for the passage 21. The connector member 15 has an annular, external shoulder 25 and terminates inwardly in a circular end face 27.

The connector member 17 has exterior threads 29 and 31 to facilitate attachment, respectively, to the nut 19 and to a suitable conduit (not shown). The connector member 15 may be attached to a conduit (not shown) in any suitable conventional manner. The connector member 17 terminates inwardly in a circular end face 33 which confronts and engages the end face 27.

The nut 19 is a tubular member sized to fit over the connector members 15 and 17 in coaxial relationship. The nut 19 has internal threads 35 to attach the nut to the connector 17. The nut 19 has a radially inwardly projecting, and circumferentially extending, flange 37 which bears against the annular shoulder 25 of the connector member 15. By turning of the nut 19 the connector members 15 and 17 can be moved axially toward each other to the position shown in FIG. 1, and conversely, by loosing of the nut 19, the connector members may be axially separated.

Although the connector 11 may be utilized for connecting many different kinds of conduits, in the embodiment illustrated, the connector is adapted for use with pipes carrying cryogenic liquid. Although the seal 13 is shown being used with the connector 11, it should be understood that the seal 11 may be used in many other environments.

Referring to FIG. 2, the connector member 15 has radially spaced, concentrically arranged, inner and outer, cylindrical, peripheral surfaces 39 and 41 interconnected by an annular surface 43. The surfaces 39, 41 and 43 define an annular groove in the end face 27 with the surface 43 being the end wall. Similarly, the connector member 17 has inner and outer, concentrically arranged, radially spaced, cylindrical, peripheral surfaces 45 and 47 interconnected by an annular surface 49 to an annular groove in the end face 33.

The connector members 15 and 17 are interconnected so that the annular grooves in the end faces 27 and 33 thereof are in registry to thereby define an annular seal channel coaxial with the passage 21 and the connector members 15 and 17. Although other cross-sectional shapes can be used, in the embodiment illustrated the seal channel is rectangular in axial cross section and is square in axial cross section when the connector members 15 and 17 are held tightly together by the nut 19 as shown in FIG. 2. Thus, in the embodiment illustrated, the cylindrical surfaces 39 and 41 are in alignment with the cylindrical surfaces 45 and 47, respectively.

As shown in FIG. 2, the end faces 27 and 33 are in abutting relationship radially outwardly of the seal channel. However, the end faces 27 and 33 are spaced axially from each other radially inwardly of the seal channel to thereby define an axial gap 51 which completely surround the passage 21 and which is in communication therewith as shown in FIG. 1.

The seal 13 is annular and shaped to fit within the seal channel formed by the end faces 27 and 33. The seal 13 includes a sealing ring 53 of deformable plastic material, an inner retainer ring 55 and an outer retainer ring 57. The plastic from which the sealing ring 53 is constructed must be deformable so that it can generally assume the shape of the seal channel and flow into the minute surface irregularities in the surfaces defining such channel to thereby produce a tight seal. In addition, if the seal 13 is to be used in cryogenic service, the plastic material should be of the type which retains its ductility at low temperatures. Fluoroplastics such as polytetraflouroethylene and Kel-F possess these properties and the sealing ring 53 may be constructed from such plastics.

The sealing 13 in the embodiment illustrated includes two annular flanges 59 and 61 integrally interconnected by a cylindrical web 63 to provide a generally I-shaped axial cross section for the sealing ring. The sealing ring has inner and outer, circumferentially extending, peripheral surfaces 65 and 67, respectively, and annular end faces 69 and 71.

The flanges 59 and 61 project radially on both sides of the web 63 to define inner and outer notches or channels 73 and 75, respectively, in which the retainer rings 55 and 57 are mounted. The notches 73 and 75 have cross sections which generally conform to the cross-sectional shape of the retainer ring mounted therein, and in the embodiment illustrated, each of the notches is generally channel-shaped or rectangular in axial cross section. As shown in FIG. 4, the notches 73 and 75 open inwardly and outwardly respectively, and the notches are radially aligned.

Each of the retainer rings 55 and 57 is preferably constructed of metal. In the event that the seal 13 is to be utilized in cryogenic service, the retainer rings may be constructed, for example, of Inconel X-750.

In the embodiment illustrated, each of the retainer rings 55 and 57 is generally rectangular in axial cross section with the long dimension of the rectangle extending axially. The retainer rings 55 and 57 are mounted in their respective notches to define radial gaps 77 and 79, respectively, between the retainer rings and the web 63 of the sealing ring 53. Each of the retainer rings 55 and 57, in the embodiment illustrated is in the form of a continuous, unsplit, cylindrical ring and fits within its respective notch 73 and 75 without significant axial clearance so that the retainer rings are mounted on the sealing ring to form a unitary structure.

The seal 13 is placed within the seal channel with the retainer rings 55 and 57 being generally concentric and being held in radially spaced relationship by the web 63 of the sealing ring 53 as shown in FIGS. 1 and 2. When initially placed within the seal channel, the peripheral surfaces 65 and 67 of the sealing ring 53 are in radially spaced relationship to the surfaces 39, 45 and 41, 47, respectively, and the retainer rings 55 and 57 fit loosely within the seal channel.

The nut 19 is then turned to draw the end faces 27 and 33 axially toward each other and to move the end surfaces 43 and 49 of the seal channel toward each other. The end surfaces 43 and 49 contact the end faces 69 and 71, respectively, of the sealing ring 53, and apply an axial compressive force to the sealing ring. As the sealing ring is deformable, the axial compressive force applied thereto causes an axial shortening of the sealing ring with consequent radial expansion thereof. Radial expansion of the sealing ring 53 causes flow of the plastic material into the gaps 77 and 79 and into the space between the peripheral walls of the seal channel and the peripheral surfaces of the sealing ring 53. Preferably, the seal 13 is dimensioned so that when the nut 19 is tightened and the end faces 27 and 33 are in abutment, the seal 13 will be under substantial compressive force and will completely fill the channel as shown in FIG. 2.

By comparing FIGS. 2 and 4, it can be seen that the deformation of the sealing ring 53 results in a radial thickening of the web 63 and of the flanges 59 and 61. In addition, the axial dimension of the flanges 59 and 61 is reduced whereas the axial dimension of the web 63 remains unchanged.

The retainer rings 55 and 57 are noncompressible axially in response to the axial force applied by the members 15 and 17 to the sealing ring 61. As shown in FIG. 2, the retainer rings 55 and 57 extend completely across the juncture between the connector members 15 and 17 to prevent extrusion or flow of the deformable plastic sealing ring 53 out of the seal channel and between the end faces 27 and 33.

As the web 63 expands radially, it applies a radial compressive force to the inner retainer ring 55 and places the outer retainer ring 57 in tension. Thus, the retainer rings 55 and 57 resist the tendency of the web 63 to expand radially in response to the axial compressive force, and this assures that there will be required a very substantial axial compressive force to obtain the desired amount of radial expansion of the sealing ring 53. As a large axial force must be applied to the sealing ring 53, the plastic material is more likely to conform to the minute surface irregularities of the surfaces of the seal channel to thereby provide a very effective seal.

When the connector members 15 and 17 are separated, it is desirable to have the sealing ring 53 return to approximately to the same shape as shown in FIG. 4. When the nut 19 is loosened, to remove the axial restraint on the sealing ring 53, the radial compressive force applied by the retainer rings 55 and 57 to the web 63 tends to reduce the radial dimension of the web 53 and to axially elongate the sealing ring 53.

Although exemplary embodiments of the invention have been shown and described, many changes, modifications and substitutions may be made by one having ordinary skill in the art without necessarily departing from the spirit and scope of this invention

I claim:

1. A seal comprising:
a sealing ring constructed of deformable plastic material and having inner and outer peripheral surfaces, said sealing ring having two axially spaced circumferentially extending flanges interconnected by a circumferentially extending web to define a generally I-shaped axial cross section for the sealing ring with inner and outer generally annular grooves on the inner and outer peripheral surfaces, respectively, of said sealing ring, said web having inner and outer peripheral surfaces defining inner and outer walls for the inner and outer grooves, respectively;
inner and outer retainer rings positioned within the inner and outer grooves, respectively, to thereby mount the retainer rings on the sealing ring, said inner and outer retainer rings and the sealing ring being generally concentrically arranged with a region of the sealing ring radially separating the retainer rings; and
each of said retainer rings being spaced from the inner wall of the associated groove to define a radial clearance space when the sealing ring is not subjected to an axial compressive force, said radial clearance spaces providing a volume into which the sealing ring can radially expand in response to an axial compressive force on the sealing ring, said inner and outer retainer rings limiting the amount of radial expansion which the region of the sealing ring lying therebetween can undergo to thereby assure that said axial compressive force will be operative to maintain the sealing ring in compression to effect a tight seal.

2. A seal as defined in claim 1 wherein at least one of said retainers rings is generally rectangular in axial cross section with the long dimension of the rectangle extending generally axially.

3. A seal comprising:
a sealing ring constructed of deformable plastic material, said sealing ring having radially spaced inner and outer peripheral surfaces, said sealing ring being compressible axially and expandable radially in response to an axial compressive force;
inner and outer retainer rings engaging the inner and outer peripheral surfaces, respectively, of said sealing ring with said inner and outer retainer rings and the sealing ring being generally concentrically arranged, each of said retainer rings being constructed of metal, said retainer rings limiting the amount of radial expansion of the section of the sealing ring lying intermediate said retainer rings;
each of said retainer rings having means for at least substantially preventing axial compression thereof in response to the axial compressive force on the sealing ring; and
said inner peripheral surface includes inner wall means defining an inner notch and said outer peripheral surface includes outer wall means defining an outer notch, the inner and outer retainer rings being loosely receivable at least partially within the inner and outer notches, respectively, to thereby hold said retainer rings and said sealing ring together, said retainer rings being spaced from at least a portion of their associated wall means to thereby provide a radial clearance space between the sealing ring and each of the retainer rings at least when the sealing ring is not radially expanded.

4. A seal as defined in claim 3 wherein said plastic material is a fluoroplastic.

5. A seal comprising:
a sealing ring constructed of deformable plastic material, said sealing ring having radially spaced inner and outer peripheral surfaces, said sealing ring being compressible axially and expandable radially in response to an axial compressive force;
inner and outer retainer rings engaging the inner and outer peripheral surfaces, respectively, of said sealing ring with said inner and outer retainer rings and the sealing ring being generally concentrically arranged, each of said retainer rings being constructed of metal, said retainer rings limiting the amount of radial expansion of the section of the sealing ring lying intermediate said retainer rings;
each of said retainer rings having means for at least substantially preventing axial compression thereof in response to the axial compressive force on the sealing ring, and
said sealing ring including two axially spaced flanges integrally interconnected by a web to define a generally I-shaped axial cross section for said sealing ring with inner and outer annular notches on the inner and outer peripheral surfaces, respectively, of said sealing ring, each of said retainer rings being generally rectangular in axial cross section, said web having inner and outer peripheral surfaces defining inner walls for the inner and outer notches, respectively, said inner and outer retainer rings being positioned in said inner and outer notches, respectively, with a radial clearance space between each of said retainer rings and the inner wall of its associated notch at least when the sealing ring is not radially expanded.

6. In combination:
a first member having a passage extending therethrough an an end face with the passage opening at said end face;
a second member having a passage extending therethrough and an end face with the passage opening at said end face of said second member;
each of said end faces having a surface defining a generally annular groove, said members being arranged with said end faces thereof in generally confronting relationship and with said grooves in general registry, said grooves defining a seal channel;
means for interconnecting said members for movement generally toward and away from each other to thereby vary the axial dimension of the seal channel;
a sealing ring of deformable plastic material positioned in said seal channel, said sealing ring being engageable with said surfaces of said members and having inner and outer peripheral surfaces, said sealing ring being compressible axially and expandable radially in response to the application of an axial compressive force to the sealing ring as a result of movement of the two members toward each other;
inner and outer retainer rings in said sealing channel engaging the inner and outer peripheral surfaces, respectively, of said sealing ring, said retainer rings overlying the juncture between said members to prevent flow of the sealing ring out of said sealing channel and into said juncture when the axial compressive force is applied to the sealing ring; and
each of said retainer rings having means for at least substantially preventing axial compression thereof in response to the axial compressive force exerted by said two members on said sealing ring, said inner peripheral surface including inner wall means defining an inner annular notch and said outer peripheral surface including outer wall means defining an outer annular notch, said inner and outer retainer rings being positioned at least partially within said inner and outer notches, respectively, with a radial clearance space between each of the retainer rings and the associated wall means to provide spaces for the radial expansion of the sealing ring.

7. In combination:
a first member having a passage extending therethrough and an end face with the passage opening at said end face;
a second member having a passage extending therethrough and an end face with the passage opening at said end face of said second member;
each of said end faces having a surface defining a generally annular groove, said members being arranged with said end faces thereof in generally confronting relationship and with said grooves in general registry, said grooves defining a seal channel;

means for interconnecting said members for movement generally toward and away from each other to thereby vary the axial dimension of the seal channel;

a sealing ring of deformable plastic material positioned in said seal channel, said sealing ring being engageable with said surfaces of said members and having inner and outer peripheral surfaces, said sealing ring being compressible axially and expandable radially in response to the application of an axial compressive force to the sealing ring as a result of movement of the two members toward each other;

inner and outer retainer rings in said sealing channel engaging the inner and outer peripheral surfaces, respectively, of said sealing ring, said retainer rings overlying the juncture between said members to prevent flow of the sealing ring out of said sealing channel and into said juncture when the axial compressive force is applied to the sealing ring;

each of said retainer rings having means for at least substantially preventing axial compression thereof in response to the axial compressive force exerted by said two members on said sealing ring; and said sealing ring having two circumferentially extending axially spaced flanges integrally connected to a circumferentially extending web to define a generally I-shaped axial cross section for said sealing ring with inner and outer annular notches on the inner and outer peripheral surfaces, respectively, of said sealing ring, each of said retainer rings being constructed of metal and being generally rectangular in axial cross section, said web having inner and outer peripheral surfaces defining inner walls for the inner and outer notches, respectively, said inner and outer retainer rings being positioned in said inner and outer notches, respectively, with a radial clearance space between each of said retainer rings and the inner wall of its associated notch to thereby provide space for the radial expansion of the sealing ring, sad sealing ring being constructed of polyfluorotetraethylene.

8. In combination:

a first member having a first face;

a second member having a second face;

each of said faces having a surface defining a generally annular groove, said members being arranged with said faces thereof in generally confronting relationship and with said grooves in general registry, said grooves defining a generally annular seal channel, the juncture of said members lying intermediate the opposite ends of said seal channel;

means for interconnecting said members for movement generally toward and away from each other to thereby vary the spacing between said ends of the seal channel;

a sealing ring of deformable plastic material positioned in said seal channel, said sealing ring being engageable with said ends of said seal channel, said sealing ring being compressible in a first direction and expandable in a second direction in response to the application of a compressive force to the sealing ring as a result of movement of the two members toward each other, said first direction being generally transverse to said second direction;

said sealing ring having first and second peripheral surfaces spaced from each other in said direction, said first peripheral surface having wall means defining a first generally annular groove and said second peripheral surface including wall means defining a second generally annular groove;

first and second retainer rings at least partially in said first and second grooves, respectively, said retainer rings extending across the juncture between said members to prevent flow of the material of the sealing ring out of said sealing channel and into said juncture when the axial compressive force is applied to the sealing ring; and each of said retainer rings having a relatively flat surface in cross section confronting said juncture.

9. A combination as defined in claim 8 wherein each of said retainer rings is generally rectangular in axial cross section with the dimension of the cross section being greater in the first direction than in the second direction.

10. A combination as defined in claim 8 wherein the dimension of each of said retainer rings in said first direction is less than the distance between said ends of the seal channel even when said compressive force is applied.

11. A combination as defined in claim 8 wherein said retainer rings and said sealing ring substantially completely fill said seal channel when said sealing ring is placed under a predetermined amount of said compressive force.